United States Patent
Park

(10) Patent No.: US 8,785,781 B2
(45) Date of Patent: Jul. 22, 2014

(54) CONNECTING TAB OF BATTERY PACK, COUPLING STRUCTURE BETWEEN THE CONNECTING TAB AND WIRE, AND COUPLING METHOD THEREOF

(75) Inventor: Hankyu Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 716 days.

(21) Appl. No.: 12/983,807

(22) Filed: Jan. 3, 2011

(65) Prior Publication Data
US 2011/0308856 A1  Dec. 22, 2011

Related U.S. Application Data

(60) Provisional application No. 61/356,983, filed on Jun. 21, 2010.

(51) Int. Cl.
*H01R 4/02* (2006.01)
*H01R 9/24* (2006.01)
*H01M 2/20* (2006.01)
*H01M 2/30* (2006.01)

(52) U.S. Cl.
CPC .............. *H01M 2/204* (2013.01); *Y02E 60/12* (2013.01); *H01M 2/20* (2013.01)
USPC .......................... 174/84 R; 439/886; 439/874

(58) Field of Classification Search
CPC ......... H01M 2/20; H01M 2/30; H01M 2/202; H01M 2/204
USPC .................. 439/886, 874; 174/84 R
See application file for complete search history.

(56) References Cited

U.S. PATENT DOCUMENTS

| | | | | |
|---|---|---|---|---|
| 1,568,644 A | * | 1/1926 | Waller | 439/874 |
| 4,973,257 A | * | 11/1990 | Lhotak | 439/81 |
| 5,183,419 A | * | 2/1993 | Dewar | 439/765 |
| 5,312,269 A | * | 5/1994 | Hwang | 439/500 |
| 5,830,598 A | * | 11/1998 | Patterson | 429/121 |

(Continued)

FOREIGN PATENT DOCUMENTS

CN    201130687 Y    10/2008
CN    201425951 Y    3/2010

(Continued)

OTHER PUBLICATIONS

Extended European Search Report dated Jan. 17, 2012 for corresponding EU Application No. 11153326.1.

*Primary Examiner* — Jeremy C Norris
*Assistant Examiner* — Nathan Milakovich
(74) *Attorney, Agent, or Firm* — Knobbe Martens Olson & Bear LLP

(57) ABSTRACT

Embodiments of the present invention provide a connecting tab of a battery pack, which allows a wire to be firmly coupled to a battery cell or a protective circuit module, a coupling structure between the connecting tab and a wire, and coupling method thereof. In one embodiment of the present invention, the connecting tab coupled to a battery cell or a protective circuit module includes a first conductive layer electrically connected to the battery cell or the protective circuit module, and a second conductive layer formed on the first conductive layer and coupled to a wire. The second conductive layer may include a pair of coupling protrusions upwardly protruding for connection of the wire. A solder may further be formed on the coupling protrusions and the wire.

14 Claims, 14 Drawing Sheets

(56) References Cited

U.S. PATENT DOCUMENTS

| | | | |
|---|---|---|---|
| 6,146,788 A | 11/2000 | Ikeda et al. | |
| 6,168,470 B1* | 1/2001 | Ikeda et al. | 439/620.08 |
| 6,290,552 B1* | 9/2001 | Saito et al. | 439/736 |
| 6,390,858 B2* | 5/2002 | Saito et al. | 439/736 |
| 6,428,364 B2* | 8/2002 | Saito et al. | 439/736 |
| 6,431,921 B2* | 8/2002 | Saito et al. | 439/736 |
| 7,488,556 B2* | 2/2009 | Byun et al. | 429/211 |
| 7,611,384 B2* | 11/2009 | Maguire | 439/627 |
| 7,666,544 B2 | 2/2010 | Barrault et al. | |
| 7,993,774 B2* | 8/2011 | Heo et al. | 429/158 |
| 2001/0046816 A1 | 11/2001 | Saito et al. | |
| 2002/0113685 A1* | 8/2002 | Izaki et al. | 337/405 |
| 2006/0032667 A1* | 2/2006 | Sato | 174/260 |
| 2007/0024407 A1* | 2/2007 | Senda et al. | 337/159 |
| 2007/0141900 A1 | 6/2007 | Davis et al. | |
| 2007/0275299 A1* | 11/2007 | Larsen | 429/100 |
| 2008/0113262 A1* | 5/2008 | Phillips et al. | 429/149 |
| 2008/0286640 A1* | 11/2008 | Naito | 429/100 |
| 2008/0305390 A1* | 12/2008 | Naito | 429/159 |
| 2009/0130546 A1* | 5/2009 | Byun et al. | 429/129 |
| 2009/0169991 A1* | 7/2009 | Yeh | 429/185 |
| 2009/0274956 A1* | 11/2009 | Kosugi et al. | 429/156 |
| 2010/0015519 A1* | 1/2010 | Trester et al. | 429/160 |
| 2010/0086841 A1* | 4/2010 | Moon | 429/156 |
| 2010/0248029 A1* | 9/2010 | Butt et al. | 429/211 |
| 2011/0003193 A1* | 1/2011 | Park et al. | 429/159 |
| 2011/0081574 A1* | 4/2011 | Jo et al. | 429/211 |
| 2011/0097619 A1* | 4/2011 | Park | 429/159 |
| 2011/0101920 A1* | 5/2011 | Seo et al. | 320/127 |
| 2011/0117412 A1* | 5/2011 | Park | 429/121 |
| 2011/0180291 A1 | 7/2011 | Matthias et al. | |
| 2011/0262777 A1* | 10/2011 | Choi et al. | 429/7 |
| 2012/0015550 A1 | 1/2012 | Ikeda et al. | |
| 2012/0112527 A1* | 5/2012 | Kroulik et al. | 307/9.1 |
| 2012/0208410 A1 | 8/2012 | Ikeda et al. | |
| 2012/0258335 A1* | 10/2012 | Bae | 429/7 |
| 2013/0102205 A1* | 4/2013 | Onoda | 439/874 |
| 2013/0143086 A1* | 6/2013 | Lee et al. | 429/91 |
| 2013/0149571 A1* | 6/2013 | Lee et al. | 429/61 |
| 2013/0309553 A1* | 11/2013 | Kinoshita et al. | 429/158 |

FOREIGN PATENT DOCUMENTS

| | | | |
|---|---|---|---|
| JP | 06-044956 | | 2/1994 |
| JP | 2002-124246 | | 4/2002 |
| JP | 2002-313313 | | 10/2002 |
| JP | 2007-335113 | | 12/2007 |
| JP | 2008091036 A | * | 4/2008 |
| JP | 2008-311074 | | 12/2008 |
| JP | 2010-027501 | | 2/2010 |
| JP | 2011-040332 | | 2/2011 |
| KR | 10 2007-0065560 | | 6/2007 |
| WO | WO 2008/151181 | | 12/2008 |
| WO | WO 2010/003738 | | 1/2010 |
| WO | WO 2011/021614 | | 2/2011 |

\* cited by examiner

CONNECTING TAB OF BATTERY PACK, COUPLING STRUCTURE BETWEEN THE CONNECTING TAB AND WIRE, AND COUPLING METHOD THEREOF

RELATED APPLICATIONS

This application claims the benefit of U.S. Provisional Application No. 61/356,983, filed Jun. 21, 2010, entitled CONNECTING TAB OF BATTERY PACK, COUPLING STRUCTURE BETWEEN THE CONNECTING TAB AND WIRE AND COUPLING METHOD which is hereby incorporated in its entirety by reference herein.

DETAILED DESCRIPTION OF THE INVENTION

1. Technical Field

Embodiments of the present invention relate to a connecting tab of a battery pack, a coupling structure between the connecting tab and a wire, and coupling method thereof.

2. Background Art

In general, it is often difficult to use a single battery cell as a power supply for electronic equipment or electrically powered equipment such as a notebook computer, an electrically powered tool, an electric bicycle or an electrically powered scooter. Therefore, a battery pack used as a power supply for such electronic equipment or electrically powered equipment includes a plurality of battery cells connected in series/parallel.

In order to control charging and discharging operations of the battery cells or to prevent the battery cells from being over-charged or over-discharged, the battery pack may further include a protective circuit module. A conductive wire is connected between each of the battery cells and the protective circuit module.

SUMMARY

Embodiments of the present invention provide a connecting tab of a battery pack, which allows a wire to be firmly coupled to a battery cell or a protective circuit module, a coupling structure between the connecting tab and a wire, and coupling method thereof.

Embodiments of the present invention also provide a connecting tab of a battery pack, which can quickly and safely couple a wire to be firmly coupled to a battery cell or a protective circuit module, a coupling structure between the connecting tab and a wire, and coupling method thereof.

According to a first embodiment of the present invention, a connecting tab coupled to a battery cell or a protective circuit module includes a first conductive layer electrically connected to the battery cell or the protective circuit module, and a second conductive layer formed on the first conductive layer and coupled to a wire.

In this first embodiment, a connecting region through which the first conductive layer and the second conductive layer are connected to each other may further be formed at each of an end of the first conductive layer and an end of the second conductive layer.

In this first embodiment, the first conductive layer and the second conductive layer may be made of the same material or different materials each including a clad.

In this first embodiment, the second conductive layer may include a pair of coupling protrusions upwardly protruding for connection of the wire. A solder may further be formed on the coupling protrusions and the wire. A hole or a recess may be formed in the second conductive layer for the purpose of preventing the solder from excessively spreading.

According to a second embodiment of the present invention, a coupling method may include preparing a connecting tab including a first conductive layer and a second conductive layer connected to each other through a connecting region, and a pair of coupling protrusions upwardly protruding from the second conductive layer, attaching the connecting tab to a battery cell or a protective circuit module, and coupling a wire to the pair of coupling protrusions of the connecting tab.

Allowing the second conductive layer and the pair of coupling protrusions to be positioned in the second embodiment on the first conductive layer by bending the connecting region may further be performed between the preparing of the connecting tab and the attaching of the connecting tab.

The coupling of the wire may be performed in the second embodiment such that the pair of coupling protrusions are clamped after the wire is inserted into the pair of coupling protrusions.

The coupling of the wire may be performed in the second embodiment such that a solder is formed on each of the pair of coupling protrusions and the wire after the wire is inserted into the pair of coupling protrusions.

The coupling of the wire may be performed in the second embodiment such that the pair of coupling protrusions is clamped and a solder is formed on each of the pair of coupling protrusions and the wire after the wire is inserted into the pair of coupling protrusions.

Since the connecting tab of a battery pack according to an embodiment of the present invention includes a more planar first conductive layer, the first conductive layer is more easily welded to the battery cell or the protective circuit module. In addition, since a second conductive layer and a pair of fixing protrusions are formed on the first conductive layer, a wire can be more easily coupled to the second conductive layer and the pair of fixing protrusions.

In the connection tab of a battery pack according to another embodiment of the present invention, a wire is coupled to a pair of coupling protrusions provided in the connection tab. In another embodiment of the present invention, after coupling the wire to the pair of coupling protrusions, a solder may be formed. In an alternative embodiment of the present invention, after coupling the wire to the pair of coupling protrusions, protrusions are clamped and a solder is formed. Therefore, the coupling structure between the connecting tab and the wire can allow the connecting tab and the wire to be firmly coupled to each other.

Further, with the coupling structure, even when the temperature of the coupling structure rises due to a large current flowing through the wire, resulting in melting of the solder, the wire coupled to the pair of coupling protrusions inhibits the wire from being easily separated from the connecting tab.

In the coupling method of the wire and the connecting tab of the battery pack according to another embodiment of the present invention, the connecting tab is connected to a battery cell or a protective circuit module and the wire is coupled to a pair of coupling protrusions provided in the connection tab. In an alternative embodiment of the present invention, after coupling the wire to the pair of coupling protrusions, a solder may be formed. In a further embodiment of the present invention, after coupling the wire to the pair of coupling protrusions, the coupling protrusions are clamped. Furthermore, after clamping the coupling protrusions, a solder may be formed. Therefore, the time required for coupling the connecting tab and the wire to each other is shortened. In addition, since there is no dangerous factor for the entire coupling time, improved working safety is ensured.

In another embodiment, the invention comprises a connector for electrically connecting a wire to at least one battery to a protective circuit module. In this embodiment, the connector comprises a first connecting member having a first and a second surface that electrically connects to the at least one battery or the protective circuit module via the first surface. In this embodiment, the connector further comprises a second connecting member having a first and second surface that is coupled to the first connecting member so that the first surface of the second connecting member is positioned adjacent the second surface of the first connecting member and wherein the wire is electrically coupled to the second connecting member.

In another embodiment, the invention comprises a method securing a wire to either at least one battery or a protective circuit module. In this embodiment, the method comprises positioning a second connecting member with respect to a first connecting member so that a first side of the second connecting member is positioned proximate the second side of the first connecting member where the first and second members are electrically interconnected. In this embodiment, the method further comprises electrically connecting the first connecting member to the at least one battery or the protection circuit module and electrically connecting a wire to the second side of the second connecting member.

DETAILED DESCRIPTION

Reference will now be made in detail to the present embodiments of the present invention, examples of which are illustrated in the accompanying drawings. The embodiments are described below in order to explain the present invention by referring to the figures.

Figure 1:
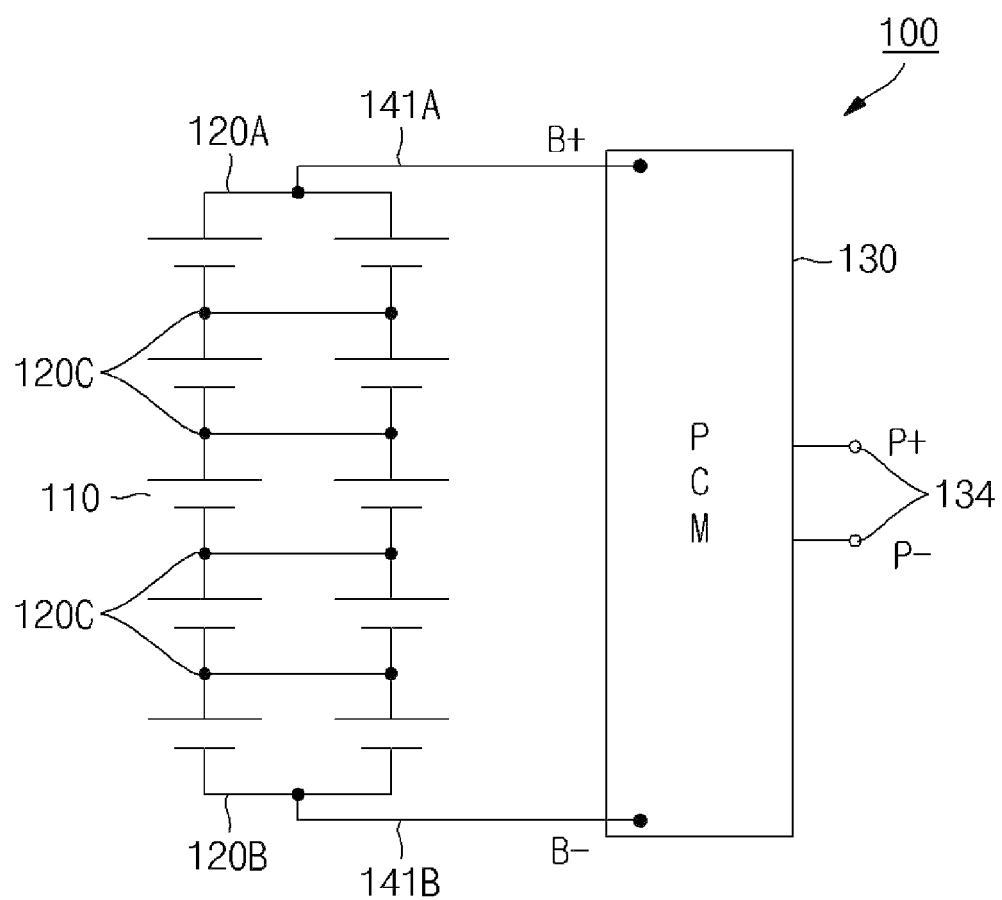
FIG. 1 is a circuit diagram schematically illustrating a battery pack according to an embodiment of the present invention.
Figure 2:
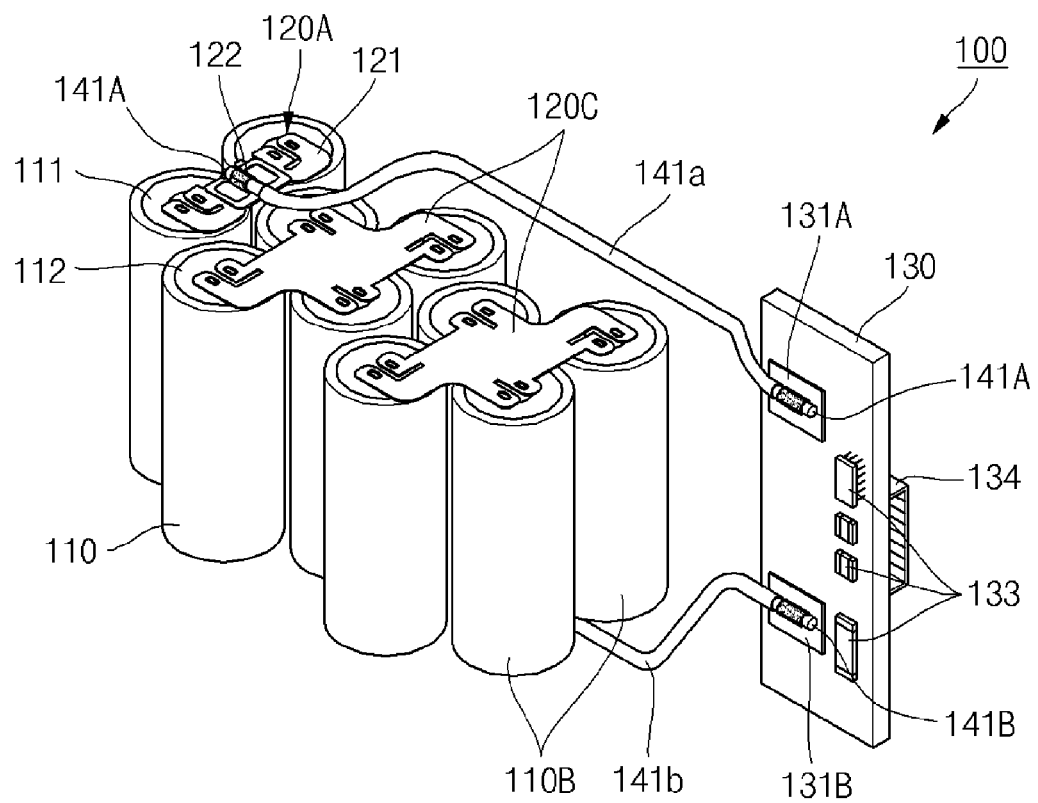
FIG. 2 is a perspective view schematically illustrating the battery pack shown in FIG. 1.

FIG. 1 is a circuit diagram schematically illustrating a battery pack according to an embodiment of the present invention, and FIG. 2 is a perspective view schematically illustrating the battery pack shown in FIG. 1.

As shown in FIGS. 1 and 2, the battery pack 100 includes a plurality of battery cells 110, connecting tabs 120A, 120B and 120C, a protective circuit module 130, and wires 141A and 141B.

Each of the battery cells 110 may be a rechargeable battery. In an exemplary embodiment, the battery cell 110 may be any one selected from a lithium ion battery, a lithium polymer battery, a lithium ion polymer battery, and equivalents thereof, but aspects of the present invention are not limited thereto. In addition, the battery cell 110 may have any one shape selected from a cylindrical shape, a prismatic shape, a pouch-type shape, equivalents thereof, but aspects of the present invention are not limited thereto.

The connecting tabs 120A, 120B and 120C electrically connect the battery cells 110 to one another in series or parallel. Although FIGS. 1 and 2 illustrate that a plurality of battery cells 110 are connected to one another in the 5-series-2-parallel configuration by the connecting tabs 120A, 120B, and 120C, aspects of the present invention are not limited thereto.

The protective circuit module 130 is electrically connected to the battery cells 110, and controls charging and discharging operations of the battery cells 110. Here, the protective circuit module 130 includes a positive electrode pad 131A and a negative electrode pad 131B to be electrically connected to the battery cells 110. The protective circuit module 130 controls the battery cells 110 not to be over-charged, and include various electronic elements 133, such as ICs, transistors, resistors, capacitors, or the like, for controlling the over-charging operation of the battery cells 110. A connector 134 may be installed in the protective circuit module 130 to allow the protective circuit module 130 to be connected to a charger (not shown) or a load (not shown).

The wire 141A and 141B electrically connect the battery cells 110 to the protective circuit module 130. The wires 141A and 141B are wrapped by insulating coatings 141a and 141b, respectively. The wire includes a positive electrode wire 141A and a negative electrode wire 141B. The positive electrode wire 141A connects a connecting tab 120A connected to a positive electrode terminal 111 of one having the highest potential among the battery cells 110 to a positive electrode pad 131A of the protective circuit module 130. That is to say, one end of the positive electrode wire 141A is coupled, connected or soldered to the connecting tab 120A, and the other end of the positive electrode wire 141A is soldered to the positive electrode pad 131A. The negative electrode wire 141B connects a connecting tab 120B connected to a negative electrode terminal 112 of one having the lowest potential among the battery cells 110 to a negative electrode pad 131B of the protective circuit module 130. That is to say, one end of the negative electrode wire 141B is coupled, connected or soldered to the connecting tab 120B, and the other end of the negative electrode wire 141B is soldered to the negative electrode pad 131B.

Here, the connecting tab 120A connected to a positive electrode terminal 111 of the battery cell 110 having the highest potential may have a two-layered structure including a first conductive layer 121 and a second conductive layer 122. That is to say, the first conductive layer 121 is welded to the positive electrode terminal 111 of the battery cell 110, and the positive electrode wire 141A is coupled, connected or soldered to the second conductive layer 122. In addition, the connecting tab 120B connected to the battery cell 110 having the lowest potential has the same configuration as the connecting tab 120A, a detailed description thereof will be omitted.

Meanwhile, the other connecting tab 120C, to which the positive electrode wire 141A or the negative electrode wire 141B is not coupled, may have a single-layered structure including only one conductive layer. The connecting tab 120C including only one conductive layer is welded to the positive electrode terminal 111 or the negative electrode terminal 112 of the battery cell 110, thereby electrically connecting the plurality of battery cells 110 to one another in series and parallel.

Each of the connecting tab 120C having a single-layered structure and the connecting tabs 120A and 120B having a two-layered structure may be any one selected from nickel, nickel-plated copper, and equivalents thereof, but aspects of the present invention are not limited thereto. Each of the connecting tabs 120A, 120B, and 120C may be formed of a metal clad including nickel and copper. In alternative embodiments, only the second conductive layer 122 of each of the two-layered connecting tabs 120A and 120B may be formed of a metal clad. As well known in the related art, the metal cladding may be formed by welding, rolling, casting or extruding rather than plating. Thus, the metal cladding may have newly improved properties compared to its base material, for example, improved wettability of the solder.

As described above, in the battery pack 100 according to the embodiment of the present invention, since the connecting tabs 120A, 120B, and 120C, specifically, the connecting tabs 120A and 120B coupled, connected or soldered with the wires 141A and 141B, have a two-layered structure, rather than a single-layered structure, a coupling force between each of the battery cells 110 and each of the connecting tabs 120A and 120B may be enhanced. Further, a coupling force between each of the wires 141A and 141B and each of the connecting tabs 120A and 120B may also be enhanced. The reason of the foregoing is that the first conductive layer 121 of the connecting tab 120A is first coupled to the battery cell 110 and the wire 141A is then coupled to the second conductive layer 122, for example. In other words, coupling between the first conductive layer 121 and the battery cell 110 is not interfered by coupling between the second conductive layer 122 and the wire 141A.

The connecting tab 120B coupled or soldered with the wire 141B is disposed on the bottom surface of the battery cell 110B (see FIG. 2). That is to say, the connecting tab 120B is attached to a negative electrode of the battery cell 110B disposed on the bottom surface thereof. Therefore, the connecting tab 120B is not seen from FIG. 2 because it is shielded by the battery cell 110B. However, since the connecting tab 120B has the same configuration and shape as the connecting tab 120A, it is not separately illustrated in the drawing.

Figure 3:
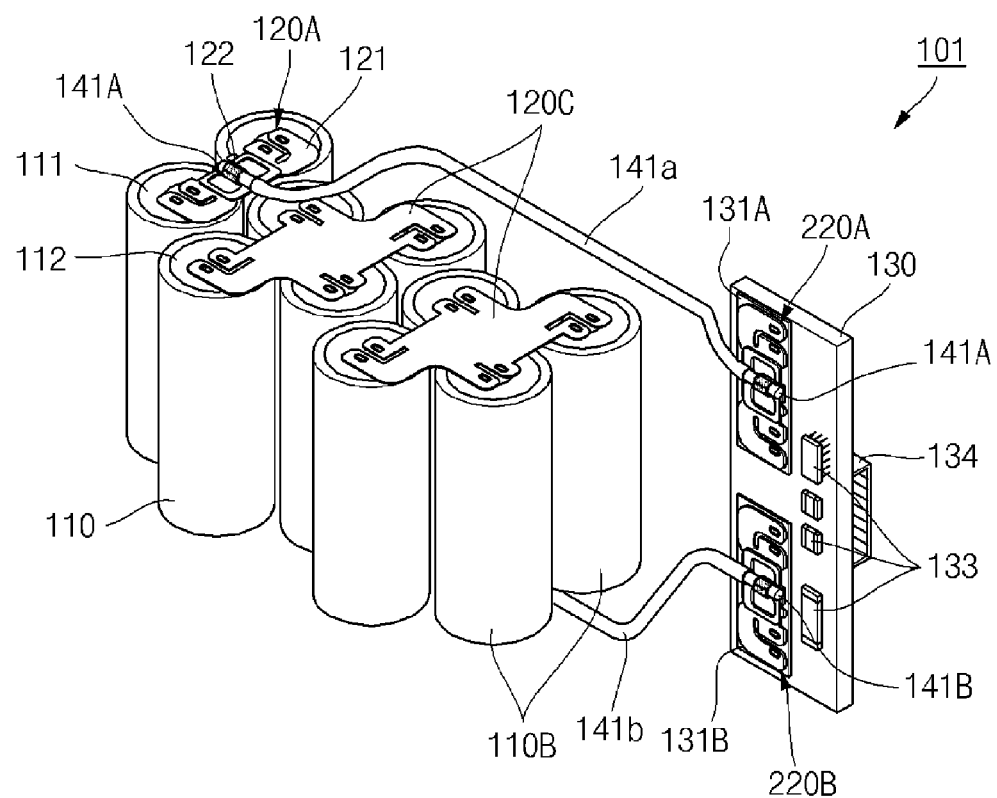
FIG. 3 is a perspective view schematically illustrating a battery pack according to another embodiment of the present invention.

FIG. 3 is a perspective view schematically illustrating a battery pack according to another embodiment of the present invention.

As shown in FIG. 3, in the battery pack 101 according to the embodiment of the present invention, connecting tabs 220A and 220B may be coupled to a protective circuit module 130. That is to say, the connecting tab 220A is connected to a positive electrode pad 131A of the protective circuit module 130, while the connecting tab 220B is connected to a negative electrode pad 131B of the protective circuit module 130. Further, a positive electrode wire 141A is connected or soldered to the connecting tab 220A, while a negative electrode wire 141B is connected or soldered to the connecting tab 220B. Since the connecting tabs 220A and 220B are substantially the same as the aforementioned connecting tabs 120A and 120B, detailed descriptions of the connecting tabs 220A and 220B will be omitted.

As described above, according to the illustrated embodiment, the connecting tabs 220A and 220B are applied not only to the battery cells 110 but also to the protective circuit module 130, thereby further enhancing a coupling force between each of the wires 141A and 141B and the protective circuit module 130.

Figure 4:
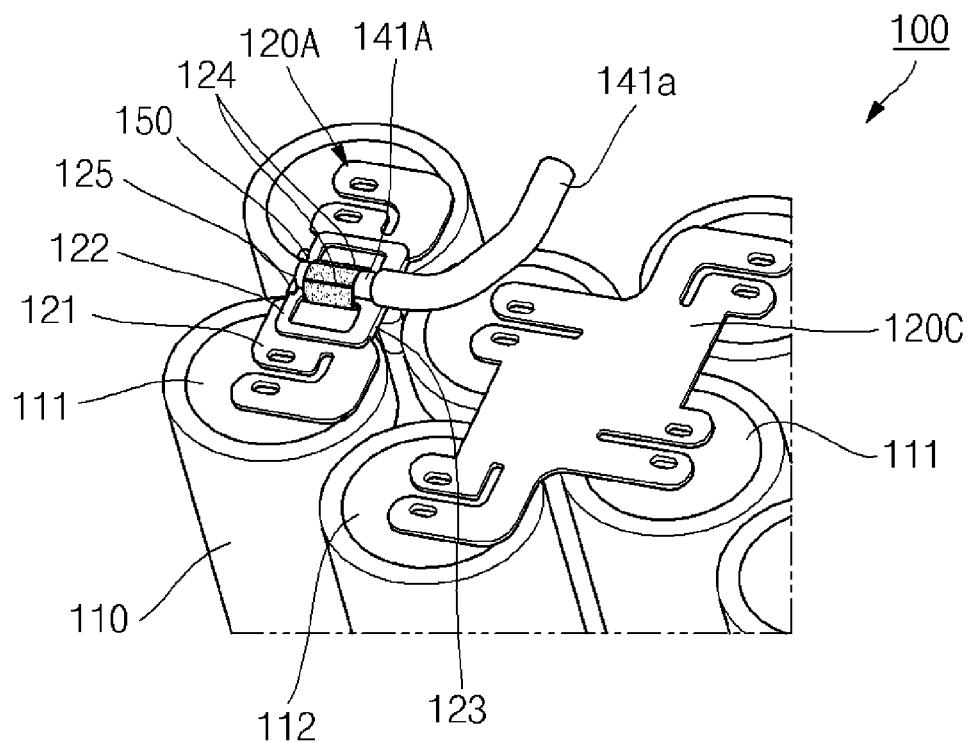
FIG. 4 is a partially perspective view illustrating a coupling structure according to an embodiment of the present invention for coupling a wire and a connecting tab of a battery pack.

FIG. 4 is a partially perspective view illustrating a coupling structure according to an embodiment of the present invention for coupling a wire and a connecting tab of a battery pack.

As shown in FIG. 4, the connecting tab 120A of the battery pack 100 shown in FIG. 1 includes a first conductive layer 121 welded to the battery cell 110, a second conductive layer 122 formed on the first conductive layer 121, a connecting region 123 through which the first conductive layer 121 and the second conductive layer 122 are connected to each other, a pair of coupling protrusions 124 formed on the second conductive layer 122 and upwardly protruding by a predetermined length, and a pressing part 125 formed on the first conductive layer 121 and pressing the second conductive layer 122. Here, the connecting region 123 and the pressing part 125 are formed in opposite directions. In addition, the pair of coupling protrusions 124 are disposed such that a distance therebetween upwardly decreases.

In the connecting tab 120A, the first conductive layer 121 may be welded to a positive electrode terminal 111 of the battery cell 110, and a conductive wire 141A may be coupled to the pair of coupling protrusions 124 provided in the second conductive layer 122. In addition, a solder 150 may further be formed on each of the conductive wire 141A and coupling protrusions 124.

Figure 5:
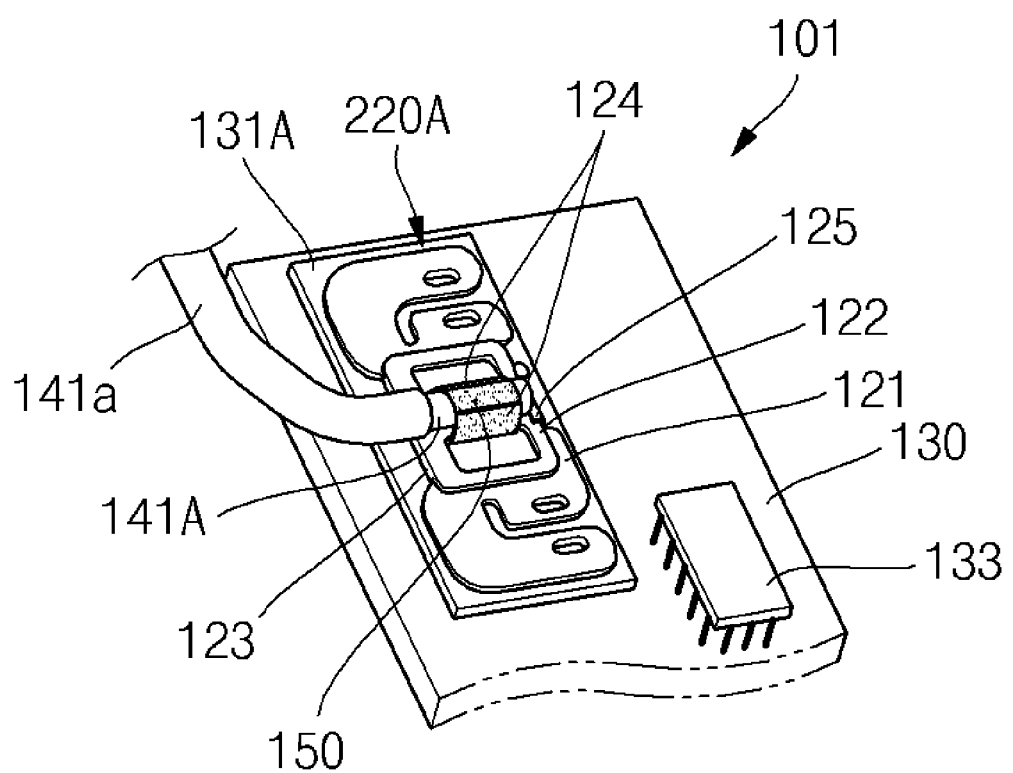
FIG. 5 is a partially perspective view illustrating a coupling structure according to another embodiment of the present invention for coupling a wire and a connecting tab of a battery pack.

FIG. 5 is a partially perspective view illustrating a coupling structure according to another embodiment of the present invention for coupling a wire and a connecting tab of a battery pack.

As shown in FIG. 5, the connecting tab 220A of the battery pack 101 shown in FIG. 3 includes a first conductive layer 121 welded to the protective circuit module 130, a second conductive layer 122 formed on the first conductive layer 121, a connecting region 123 through which the first conductive layer 121 and the second conductive layer 122 are connected to each other, a pair of coupling protrusions 124 formed on the second conductive layer 122 and upwardly protruding by a predetermined length, and a pressing part 125 formed on the first conductive layer 121 and pressing the second conductive layer 122.

In addition, in the connecting tab 220A, the first conductive layer 121 may be welded to a positive electrode pad 131A of the protective circuit module 130, and a conductive wire 141A may be coupled to the pair of coupling protrusions 124 provided in the second conductive layer 122. In addition, a solder 150 may further be formed on each of the conductive wire 141A and coupling protrusions 124.

The connecting tab 120A connected to the battery cell 110 and the connecting tab 220A connected to the protective circuit module 130 may have substantially the same configuration. In the following, it should be noted that the connecting tab 120A, the coupling structure between the connecting tab 120A and the wire 141A, and the coupling method of the connecting tab 120A and the wire 141A, which will be described below, are all applied to the previous embodiments.

Figure 6A:
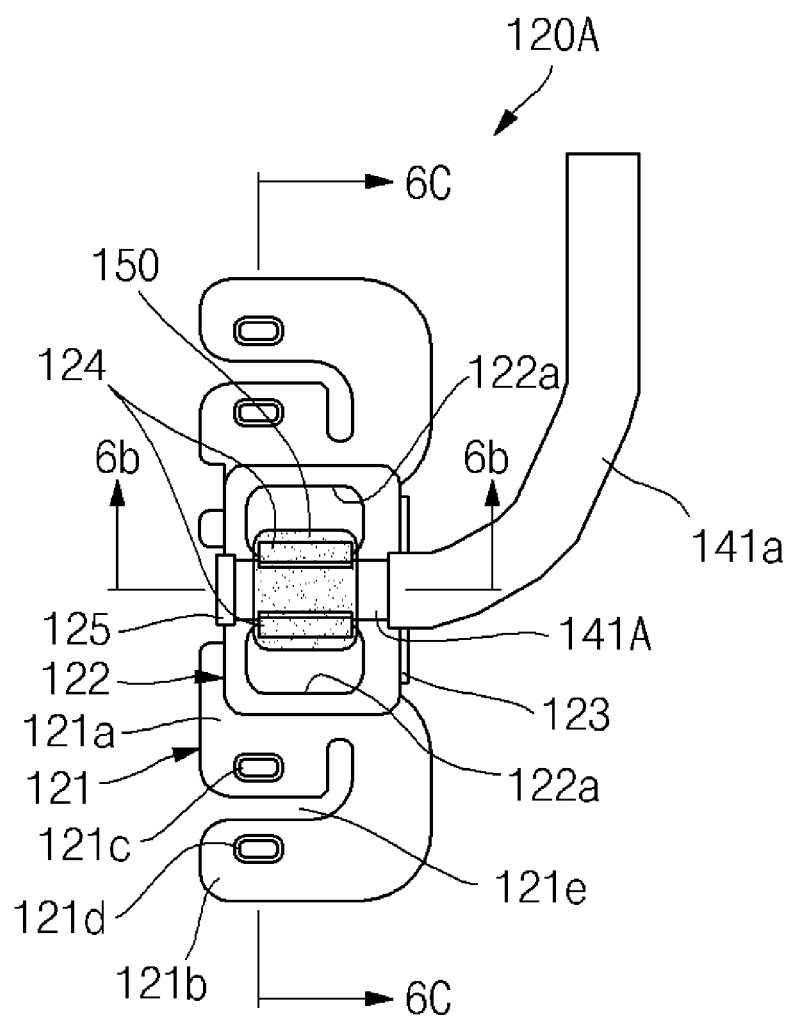
FIG. 6A is a plan view of the coupling structure between a wire and a connecting tab according to an embodiment of the present invention.
Figure 6B:
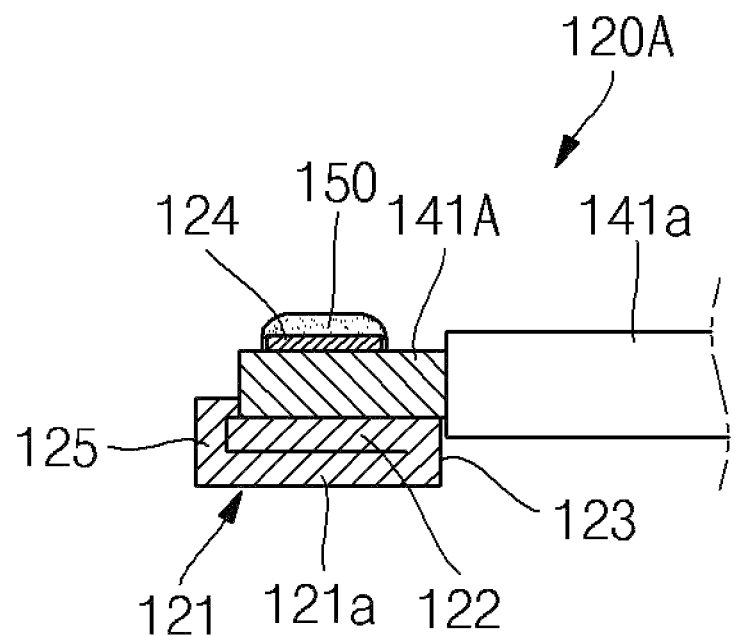
FIG. 6B is a cross-sectional view taken along the line 6b-6b of FIG. 6A.
Figure 6C:
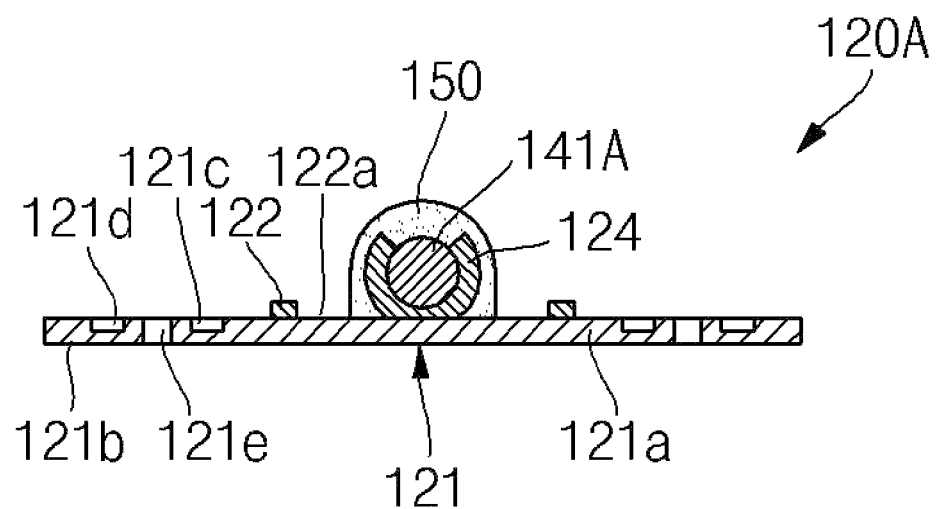
FIG. 6C is a cross-sectional view taken along the line 6c-6c of FIG. 6A.
Figure 6D:
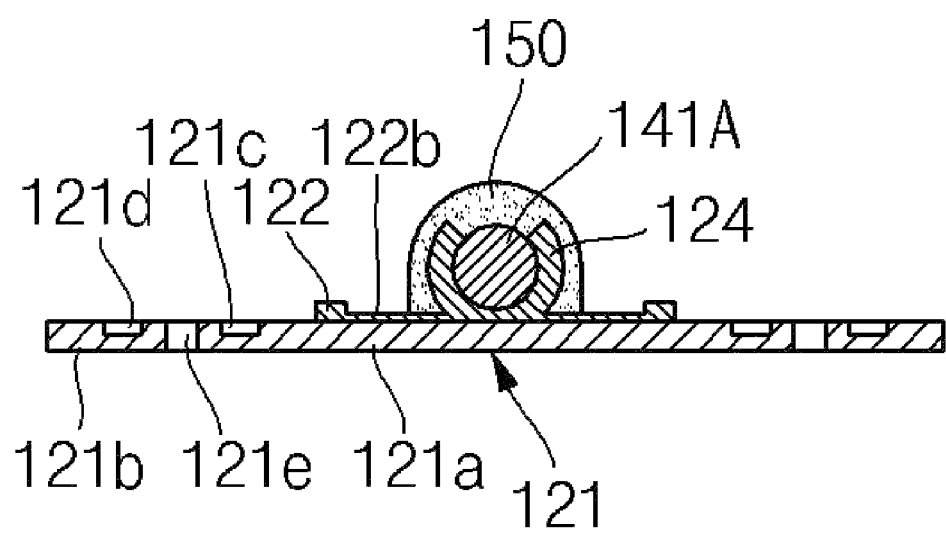
FIG. 6D is another cross-sectional view taken along the line 6c-6c of FIG. 6A.

FIG. 6A is a plan view of the coupling structure between a wire and a connecting tab according to an embodiment of the present invention, FIG. 6B is a cross-sectional view taken along the line 6b-6b of FIG. 6A, FIG. 6C is a cross-sectional view taken along the line 6c-6c of FIG. 6A, and FIG. 6D is another cross-sectional view taken along the line 6c-6c of FIG. 6A.

Referring to FIGS. 6A through 6C, the connecting tab 120A includes a includes a first conductive layer 121 connected to the battery cell 110 or the protective circuit module 130, a second conductive layer 122 formed on the first conductive layer 121, a connecting region 123 through which the first conductive layer 121 and the second conductive layer 122 are connected to each other, a pair of coupling protrusions 124 formed on the second conductive layer 122 and upwardly protruding by a predetermined length, and a pressing part 125 formed on the first conductive layer 121 and pressing the second conductive layer 122.

The first conductive layer 121 includes a substantially planar body 121a, and a substantially planar extension 121b extending in opposite directions from the body 121a. In addition, recesses 121c and 121d are formed in the body 121a and the extension 121b, respectively. During welding, a welding tool is placed on each of the recesses 121c and 121d. Thus, the connecting tab 120A is easily welded to the battery cell 110 or the protective circuit module 130. A cut portion 121e is formed between the body 121a and the extension 121b. Therefore, heat generated by the welding tool is concentrated in the recesses 121c and 121d without spreading during welding. Accordingly, welding efficiency can be further enhanced. The first conductive layer 121 may be made of any one selected from nickel, nickel-plated copper, and equivalents thereof, but aspects of the present invention are not limited thereto.

The second conductive layer 122 is substantially planar and is formed on the first conductive layer 121. The second conductive layer 122 may be formed to be slightly narrower than the body 121a of the first conductive layer 121, but aspects of the present invention are not limited thereto. Holes 122a each having a predetermined size may be formed at opposite sides of the second conductive layer 122. That is to say, the second conductive layer 122 may have the holes 122a formed at opposite sides of the wire 141A. A surface of the first conductive layer 121 is exposed upwardly through the holes 122a. The holes 122a accommodate a solder material excessively formed when forming the solder 150, thereby preventing the solder 150 from flowing to the outside of the connecting tab 120A. Like the first conductive layer 121, the second conductive layer 122 may also be made of any one selected from nickel, nickel-plated copper, and equivalents thereof, but aspects of the present invention are not limited thereto.

The connecting region 123 allows one end of the first conductive layer 121 and the second conductive layer 122 to be connected to each other. In addition, the connecting region 123 is substantially bent and may be made of the same material as the first conductive layer 121 or the second conductive layer 122.

The pair of coupling protrusions 124 upwardly protrude from the second conductive layer 122 by a predetermined length. The pair of coupling protrusions 124 is formed such that a portion of the second conductive layer 122 is cut and bent upwardly. The holes 122a are also formed in the second conductive layer 122 by cutting. The pair of coupling protrusions 124 may be made of substantially the same material as the second conductive layer 122. In addition, the pair of coupling protrusions 124 may be formed at opposite sides of the wire 141A. Further, the pair of coupling protrusions 124 becomes closer to each other upwards. Therefore, the pair of coupling protrusions 124 is configured to roughly wrap the wire 141A. Accordingly, the wire 141A is firmly coupled, fastened or connected to the connecting tab 120A. In addition, the pair of coupling protrusions 124 may be clamped by means of a separate tool. In other words, top ends of the pair of coupling protrusions may closely contact each other to then be clamped by, for example, a plier. Accordingly, a coupling force between the pair of coupling protrusions and the wire 141A is further enhanced.

The pressing part 125 is upwardly bent from the first conductive layer 121, and is further bent in a horizontal direction to then press an end of the second conductive layer 122. The pressing part 125 is formed at the opposite side of the connecting region 123. In addition, the pressing part 125 is formed at a region corresponding to the one end of the wire 141A. Therefore, the pressing part 125 limits a coupling depth of the wire 141A. Accordingly, the coupling depth of the wire 141A relative to the connecting tab 120A is controlled to be kept uniformly.

Meanwhile, the wire 141A is inserted into a space between the pair of coupling protrusions 124 and then coupled or connected to the pair of coupling protrusions 124. In addition, in order to enhance a coupling force between the wire 141A and the connecting tab 120A, the solder 150 may further be formed in each of the wire 141A and the pair of coupling protrusions 124. Further, the wire 141A is inserted into the space between the pair of coupling protrusions 124 and then coupled or connected to the pair of coupling protrusions 124, followed by clamping the pair of coupling protrusions 124. Following the clamping of the pair of coupling protrusions 124, the solder 150 may further be formed in the wire 141A and the pair of coupling protrusions 124.

The solder 150 may cover portions of the first conductive layer 121 and the second conductive layer 122 as well as the wire 141A and the pair of coupling protrusions 124. A surplus solder material remaining after being used in forming the solder 150 may be accommodated in the holes 122a formed in the second conductive layer 122. To this end, a width of each of the holes 122a is larger than that of each of the coupling protrusions 124, so that the surplus solder material may be easily accommodated in the holes 122a. In such a manner, the wire 141A is coupled, fastened or connected to the pair of coupling protrusions 124 formed in the connecting tab 120A and is wrapped by the solder 150, thereby further enhancing the coupling force between the wire 141A and the connecting tab 120A.

As shown in FIG. 6D, the recess 122b, instead of the hole 122a, may be formed in the second conductive layer 122. Since the surplus solder material is accommodated in the recess 122b, the recess 122b also prevents the surplus solder material from flowing to the outside of the connecting tab 120A.

As described above, according to one embodiment, the wire 141A is coupled, fastened or connected to the pair of coupling protrusions 124 formed in the connecting tab 120A. In addition, according to another embodiment of the present invention, after coupling the wire 141A to the pair of coupling protrusions 124 provided in the connecting tab 120A, the protrusions 124 may be clamped. In an alternative embodiment of the present invention, after coupling the wire 141A to the pair of coupling protrusions 124 provided in the connecting tab 120A, a solder 150 may be formed in each of the wire 141A and the pair of coupling protrusions 124. In a further embodiment of the present invention, after coupling the wire 141A to the pair of coupling protrusions 124 provided in the connecting tab 120A and clamping the pair of coupling protrusions 124, a solder 150 may be formed in each of the wire 141A and the pair of coupling protrusions 124. Therefore, according to embodiments of the present invention, the coupling force between the connecting tab 120A and the wire 141A can be further enhanced.

Further, according to an embodiment of the present invention, even when the solder 150 is melted by a high-temperature heat generated due to a large current flowing through the wire 141A, the wire 141A coupled to the pair of coupling protrusions 124 may prevent the wire 141A from being easily separated from the connecting tab 120A.

FIGS. 7A through 7F are perspective view sequentially illustrating a coupling method of a wire using a connecting tab, according to an embodiment of the present invention.

Referring to FIGS. 7A through 7F, the coupling method according to the embodiment of the present invention for coupling a connecting tab 120A and a wire 141A of a battery pack 100 include preparing the connecting tab 120A, bending the connecting tab 120A, electrically connecting the connecting tab 120A to the battery cell and/or the protective circuit module, and coupling the wire 141A to the connecting tab 120A.

The coupling method may further include clamping a pair of coupling protrusions 124 provided in the connecting tab 120A.

The coupling method may further include forming a solder 150 in the wire 141A. Here, the solder 150 may be formed after the coupling of the wire 141A. Alternatively, the solder 150 may be formed after the clamping of the pair of coupling protrusions 124.

Figure 7A:
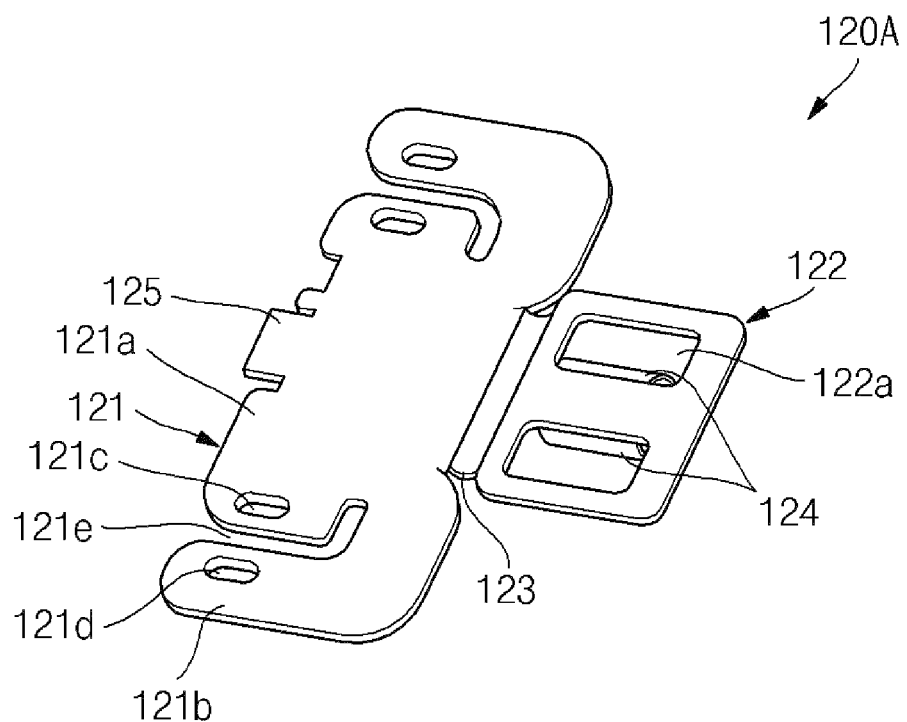
FIGS. 7A through 7F are perspective view sequentially illustrating a coupling method of a wire using a connecting tab, according to another embodiment of the present invention.

As shown in FIG. 7A, the preparing of the connecting tab 120A may include preparing a connecting tab 120A including a first conductive layer 121, a second conductive layer 122, a connecting region 123, a pair of coupling protrusions 124 and a pressing part 125. Here, the first conductive layer 121 and the second conductive layer 122 are formed to be substantially planar. The connecting region 123 is slightly recessed along the boundary line of the first conductive layer 121 and the second conductive layer 122 so as to be easily bent. Since the connecting region 123 is yet to be bent, the pair of coupling protrusions 124 are formed to be directed to the bottom side, rather than the upper side. In addition, a pressing part 125 formed at the opposite side of the connecting region 123 is also yet to be bent upwardly, the pressing part 125 and the first conductive layer 121 are substantially parallel to each other.

In addition, since recesses 121c and 121d for welding, respectively formed in a body 121a and an extension 121b forming the first conductive layer 121, a cut portion 121e for preventing heat from spreading, and holes 122a formed in the second conductive layer 122, for preventing a solder material from excessively spreading are substantially the same as described above, detailed descriptions thereof will be omitted.

Figure 7B:
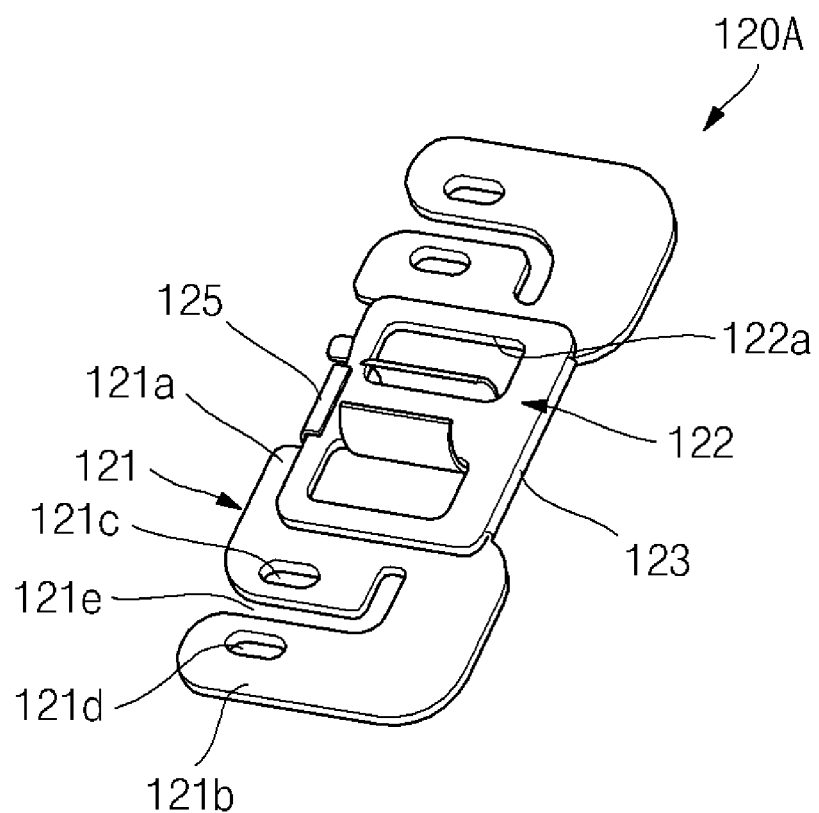

As shown in FIG. 7B, the bending of the connecting tab 120A includes bending the first conductive layer 121 or the second conductive layer 122 to allow the second conductive layer 122 to be positioned on the first conductive layer 121. The connecting region 123, through which the first conductive layer 121 and the second conductive layer 122 are connected to each other, is bent, thereby allowing the second conductive layer 122 to be positioned on the first conductive layer 121. Here, a pressing part 125 protruding from the first conductive layer 121 in a horizontal direction is also upwardly bent. That is to say, the pressing part 125 is bent in a substantially "U" shape. In other words, the pressing part 125 is bent such that one end of the pressing part 125 covers one end of the second conductive layer 122, thereby preventing a gap from being created between the first conductive layer 121 and the second conductive layer 122. As described above, the pressing part 125 allows the first conductive layer 121 and the second conductive layer 122 to closely contact each other. In addition, the pressing part 125 limits a coupling depth of the wire 141A, which will later be described. Further, in the bending of the connecting tab 120A, the holes 122a formed in the second conductive layer 122 are allowed to be positioned on the first conductive layer 121. Therefore, a predetermined region of the first conductive layer 121 corresponding to the hole 122a is exposed to the upper side.

Figure 7C:
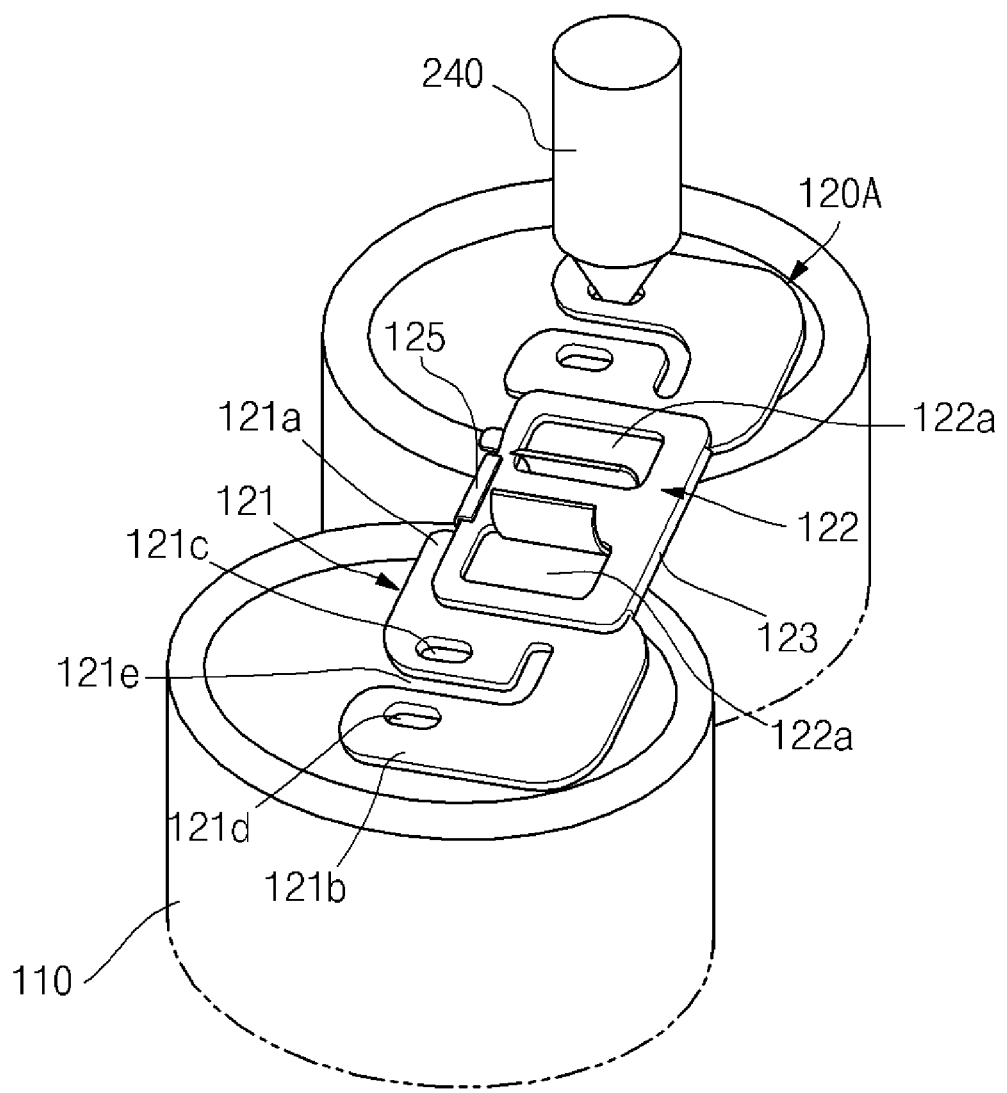

As shown in FIG. 7C, electrically connecting the connecting tab 120A to the battery cell and/or the protective circuit module includes electrically connecting the first conductive layer 121 of the connecting tab 120A to the battery cell 110 and/or the protective circuit module (not shown). For example, the first conductive layer 121 of the connecting tab 120A is poisoned on the battery cell 110. More specifically, the body 121a and the extensions 121b of the first conductive layer 121 are positioned on the battery cell 110. The welding tool 240 is positioned on the recesses 121c and 121d that are already formed on the body 121a and the extensions 121b. Energy of the welding tool 240 is transferred to the recesses 121c and 121d and battery cell 110, and then the recesses 121c and 121d are welded to the battery cell 110. Here, the cut portion 121e formed between the body 121a and the extension 121b makes the heat generated by the welding tool 240 concentrate to the recesses 121c and 121d without spreading during welding. Accordingly, welding efficiency can be further enhanced.

Figure 7D:
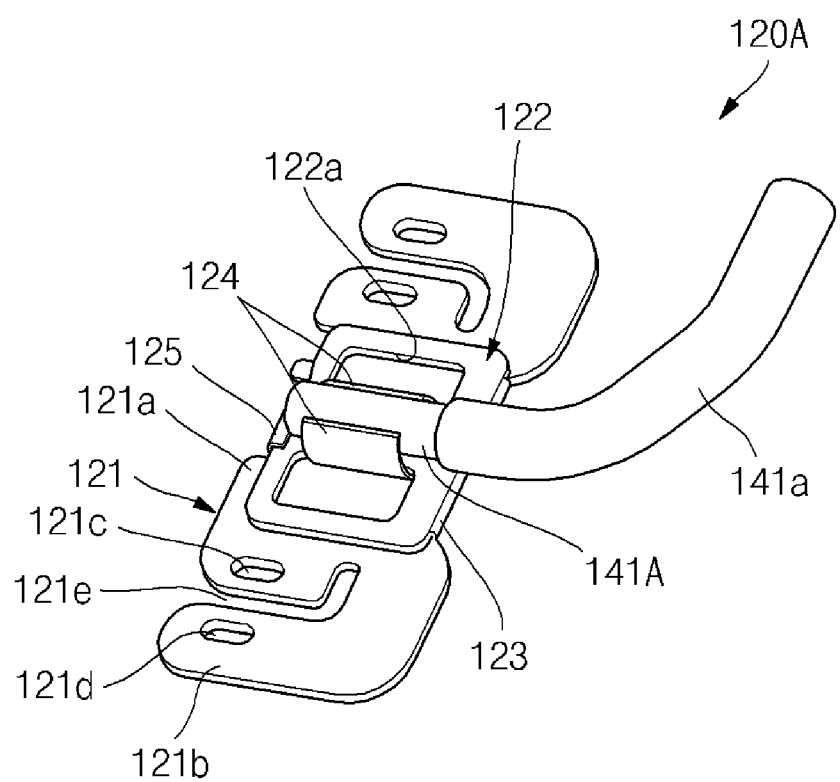

As shown in FIG. 7D, the coupling of the wire 141A includes coupling the wire 141A to a space between the second conductive layer 122 and the pair of coupling protrusions 124. Here, since the coupling depth of the wire 141A is limited by the pressing part 125, the wire 141A is coupled to the pair of coupling protrusions 124 by a predetermined length. In such a manner, the wire 141A is coupled, fastened or connected to the connecting tab 120A.

As described above, the coupling method of the connecting tab 120A and the wire 141A according to the embodiment of the present invention may be completed by the coupling of the wire 141A.

Alternatively, the coupling method for coupling the connecting tab 120A and the wire 141A may be completed after additionally performing forming a solder after the coupling of the wire 141A. In other words, the solder is formed in each of the wire 141A and the pair of coupling protrusions 124 wrapping the wire 141A, thereby allowing the wire 141A to be more firmly coupled to the connecting tab 120A. Here, the solder may be formed to cover portions of the first conductive layer 121 and the second conductive layer 122 as well as the wire 141A and the pair of coupling protrusions 124. Here, a surplus of the solder that is excessively used is accommodated in the hole 122a formed in the second conductive layer 122, thereby preventing the excessively used solder from flowing to the outside of the connecting tab 120A.

Figure 7E:
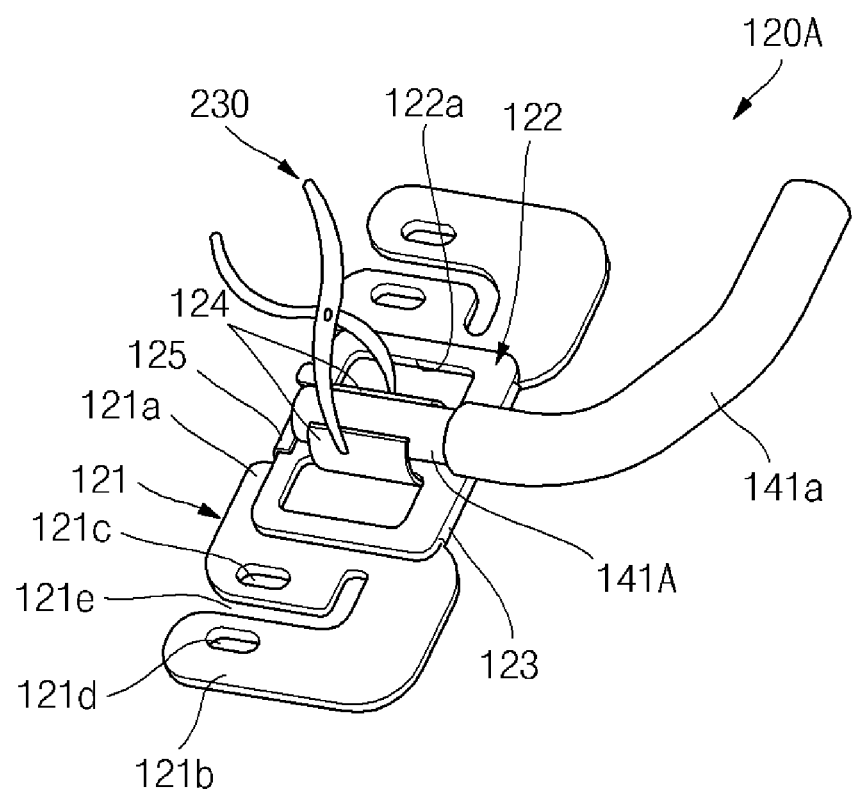

As shown in FIG. 7E, the clamping of the pair of coupling protrusions 124 includes clamping the pair of coupling protrusions 124 formed outside the wire 141A. For example, top ends of the pair of coupling protrusions 124 are clamped by a tool 230, such as a plier, thereby allowing the top ends of the pair of coupling protrusions 124 to make contact with the wire 141A more closely.

In such a manner, the coupling method according to the illustrated embodiment of the present invention may be completed immediately after the clamping of the pair of coupling protrusions 124. That is to say, even if the solder is not formed, the coupling protrusions 124 allow the wire 141A to be firmly coupled, fastened or connected to the connecting tab 120A.

Figure 7F:
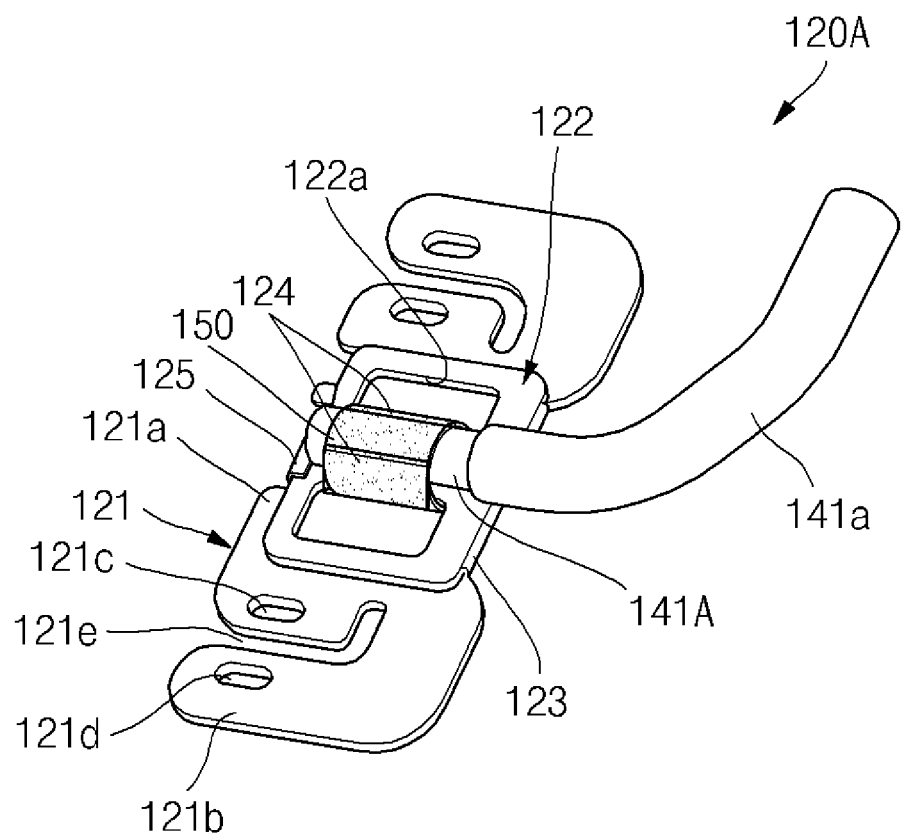

As shown in FIG. 7F, the forming of the folder 150 includes forming the solder 150 in each of the wire 141A and the pair of coupling protrusions 124. Here, the solder 150 may be formed in portions of the first conductive layer 121 and the second conductive layer 122 as well as the wire 141A and the pair of coupling protrusions 124. Since the solder material excessively used in the forming of the solder 150 is accommodated in the hole 122a formed in the second conductive layer 122, thereby preventing the surplus solder material from flowing to the outside of the connecting tab 120A. In such a manner, the wire 141A is coupled, fastened or connected to the pair of coupling protrusions 124 formed in the connecting tab 120A and is wrapped by the solder 150, thereby further enhancing a coupling force between the wire 141A and the connecting tab 120A.

As described above, in the coupling method of the wire 141A and the connecting tab 120A of the battery pack 100 according to the embodiment of the present invention, the connecting tab 120A is primarily coupled to the wire 141A using the coupling protrusions 124 provided in the connection tab 120A and secondarily coupled to the wire 141A using the solder 150, thereby shortening the entire coupling time and eliminating dangerous factors for the entire coupling time, ultimately ensuring improved working safety.

Although a connecting tab of a battery pack, a coupling structure between the connecting tab and a wire, and coupling method thereof according to a few embodiments of the present invention have been shown and described, it should be understood by those of ordinary skill in the art that various replacements, modifications and changes in the form and details may be made therein without departing from the spirit and scope of the present invention as defined by the following claims.

What is claimed is:

1. A connector for electrically connecting a wire to at least one battery or a protective circuit module, the connector comprising:
   a first connecting member having a first and a second surface that electrically connects to the at least one battery or the protective circuit module via the first surface; and
   a second connecting member having a first and second surface that is coupled to the first connecting member so that the first surface of the second connecting member is positioned adjacent the second surface of the first connecting member and wherein the wire is electrically coupled to the second connecting member; and
   at least one wire coupling member formed on the second surface of the second connecting member that mechanically couples to the wire so that the wire is electrically connected to the at least one battery or the protective circuit module via the second connecting member and the first connecting member, wherein at least one recess having a first edge is formed in the second conducting member so that the at least one wire coupling member is coupled to the first edge of the at least one recess.

2. The connector of claim 1, wherein the first connecting member comprises a body and at least one extension extending outward from the body that are sized and spaced to couple to at least one terminal on the at least one battery or the protective circuit module.

3. The connector of claim 2, wherein a cut is formed between the body and the at least one extension.

4. The connector of claim 2, wherein welding recesses are formed in the body and the at least one extension.

5. The connector of claim 1, wherein the first and second connecting members each have a first and a second side edges and wherein the first side edge of the first connecting member is coupled to the first side edge of the second connecting member.

6. The connector of claim 5 wherein the first side edge of the first connecting member is coupled to the first side edge of the second connecting member via a connecting portion that is integrally connected to the first and second connecting members.

7. The connector of claim 6, wherein the connecting portion is a bendable portion.

8. The connector of claim 5, further comprising a pressing part that engages with the second edge of the first and second connecting members.

9. The connector of claim 8, wherein the pressing part is integrally attached to the second edge of the first connecting member and defines a C-shaped opening into which the second connecting member is positioned.

10. The connector of claim 1, wherein the at least one wire coupling member comprises a first and a second wire coupling members to define a wire receiving space so that when the wire is positioned within the wire receiving space, the first and second wire coupling members engage and retain the wire in the wire receiving space and in electrical connection with the second connecting member.

11. The connector of claim 10, further comprising soldering material that is positioned over the wire in the wire receiving space, and the first and second wire coupling members to further retain the wire in the wire receiving space.

12. The connector of claim 11, wherein the second surface of the second connecting member includes one or more recesses positioned adjacent the first and second wire coupling members.

13. The connector of claim 12, wherein the one or more recesses comprise openings that extend from the second surface to the first surface of the second connecting member.

14. The connector of claim 1, wherein the first and the second connecting members are formed of different materials.

* * * * *